(12) United States Patent
Leusner et al.

(10) Patent No.: US 6,461,651 B1
(45) Date of Patent: Oct. 8, 2002

(54) SODIUM-FREE IRON COMPLEX FOR FOOD FORTIFICATION

(75) Inventors: Steven J. Leusner, Orono, MN (US); Arthur J. Friedman, Deerfield, IL (US)

(73) Assignee: General Mills, Inc., Minneapolis, MN (US)

( * ) Notice: Subject to any disclaimer, the term of this patent is extended or adjusted under 35 U.S.C. 154(b) by 1 days.

(21) Appl. No.: 09/669,708

(22) Filed: Sep. 26, 2000

(51) Int. Cl.$^7$ ................................................ A23L 1/304
(52) U.S. Cl. ...................... 426/74; 426/601; 426/648; 426/656; 426/658
(58) Field of Search .......................... 426/74, 648, 656, 426/658, 601

(56) References Cited

U.S. PATENT DOCUMENTS

| | | |
|---|---|---|
| 4,126,529 A | 11/1978 | DeBerry |
| 5,534,275 A | 7/1996 | Humbert et al. |
| 5,667,825 A | 9/1997 | Humbert et al. |
| 6,177,581 B1 * | 1/2001 | St. George .................. 556/62 |

FOREIGN PATENT DOCUMENTS

| | | |
|---|---|---|
| DE | 3718691 | 9/1988 |
| JP | 51036426 A | 3/1976 |
| WO | 99/05920 | 2/1999 |

OTHER PUBLICATIONS

Tsan et al., "Unusual Contact Shifts and Magnetic Tensor Orientation in *Rhodobacter capsulatus* Ferrocytochrome ć: NMR, Magnetic Susceptibility, and EPR Studies", *J. Am. Chem. Soc.* vol. 121, pp. 1795–1805 (1999).

Clark et al., "Ferrous Chelates of EDTA, HEDTA, and SHBED", *Inorg. Chem.*, vol. 27, pp. 1297–1298 (1988).

Lerman et al., "Mössbauer Quantitative Analysis of $Fe^{+3}$/$FE^{+2}$ Ratios in Some Phosphate and Oxide Mixtures: Possibilities and Limitations", *Earth and Planetary Science Letters* 3, pp. 409–416, (1967).

* cited by examiner

*Primary Examiner*—Helen Pratt
(74) *Attorney, Agent, or Firm*—Barnes & Thornburg

(57) ABSTRACT

Sodium-free iron II EDTA complexes useful for the preparation of iron-fortified processed foods are described. The complexes are prepared from water soluble ferrous salts and $EDTA \cdot Na_2H_2$, $EDTA \cdot Na_2Ca$, $EDTA \cdot Na_2Mg$ and $EDTA \cdot 2(NH_4)H_2$. The iron complexes can be combined with nutritional and/or non-nutritional diluents or carriers to formulate food additive iron-fortificant compositions. Iron fortified processed foods are prepared by supplementing recipes for unfortified food products with the ferrous iron EDTA complexes alone or as a component of a multicomponent food additive composition.

19 Claims, No Drawings

SODIUM-FREE IRON COMPLEX FOR FOOD FORTIFICATION

FIELD OF THE INVENTION

This invention relates to an iron complex useful for iron fortification of processed foods. More particularly, this invention is directed to sodium-free, iron II EDTA complexes and their use in the manufacture of food additives for use in fortification mixtures and iron-fortified processed foods.

BACKGROUND AND SUMMARY OF THE INVENTION

Nutritional iron deficiency affects a significant portion of the world's population. It has been recognized as a cause or a contributing factor to anemia and other physiological conditions that adversely affect performance. For that reason the use of iron supplements for fortifying processed foods to help prevent and treat iron deficiency has become a common practice in most countries throughout the world. While there are many food acceptable iron fortificants that provide adequate quantities of bioavailable iron, such fortificants can adversely affect the organoleptic properties of the iron fortified processed foods. Food iron fortificants can be roughly divided into two groups: those which are have high bioavailability, high solubility, and low stability and those which have low bioavailability, low solubility, but good food stability. Chelated forms of iron like those of the present invention, on the other hand possess good bioavailability, good solubility, and good food stability. Most recently, sodium ferric ethylenediamenetetraacetic acid complex (hereinafter "ferric EDTA") has been studied primarily for fortification purposes due to its chemical stability and good bioavailability in the presence of interfering natural iron inhibitors such as phytic acid. It has been found to be suitable for fortifying foods that require prolonged storage or high temperatures during preparation. Ferric EDTA has been reported to be two to three times more bioavailable than iron presented as a ferrous sulfate complex in some diets especially those which have high levels of iron inhibiting substances. More recently ferric EDTA has been described for use in fortification of ready-to-eat cereals either by preparing the cereal product by incorporating ferric EDTA into the cereal mix prior to cooking or by spraying a ferric EDTA solution onto the cereal product.

However, the use of ferric EDTA as an iron fortificants does have the disadvantage that it is provided, by definition, as a sodium ferric EDTA complex which means it contains sodium. Thus its use adds undesirable sodium content to the ferric EDTA fortified food products. Moreover, while the iron III component of the ferric EDTA complex is protected somewhat in its EDTA complex form from absorption blocking complexation with dietary phytic acids, iron III is known to be susceptible to such adsorption blocking complexation in the digestive tract. Also, the EDTA complexes of this invention offer the added advantage of being able to deliver other crucially needed minerals including magnesium and calcium instead of sodium. The complexed iron species is divalent iron (iron II) which is the form required for absorption in humans. Also the intimate use of reducing agents along with the EDTA form is taught to maintain the iron II EDTA in its most available oxidation state. Accordingly, there is still need for development of food acceptable bioavailable iron containing complexes which do not suffer from the disadvantages still extant with use of ferric EDTA as an iron fortificant.

Thus, it is one object of this invention to provide sodium-free iron II ferrous iron EDTA complexes and food additive compositions containing said complexes that do not suffer from the disadvantages of the use of ferric EDTA. Such sodium-free iron II complexes can be isolated in crystalline, substantially pure form and used directly as an iron fortificants of processed foods or as a component of food additive fortification mixtures.

In one embodiment of the invention there is provided a food additive composition comprising a sodium-free iron II EDTA complex in combination with a food-acceptable antioxidant or reducing agent and a nutritional or non-nutritional food acceptable diluent or carrier. In still another embodiment of the present invention there is provided an iron-fortified processed food product comprising a plurality of nutritional food ingredients selected from the group consisting of protein, fat and carbohydrate and a sodium-free iron II EDTA complex. Optionally the processed food product comprises a food acceptable antioxidant or a reducing agent in an amount effective to prevent iron II oxidation during food processing or storage. In one embodiment the nutritional food ingredients of the food product are derived from cooked cereal grain. In another, at least a portion of nutritional food ingredients in the iron fortified processed food products of this invention are of dairy origin. The sodium-free iron II EDTA complex, alone or as a component of an iron fortification mixture composition, can be blended into a recipe of an unfortified processed food product to provide a product of high bioavailable iron content.

DETAILED DESCRIPTION OF THE INVENTION

The present invention provides an iron fortificants for processed foods. Source of bioavailable iron for use in such compositions is a sodium-free iron II EDTA complex of the formula

$(^{31}OCOCH)_2NCH_2CH_2N(CH_2COO^-)_2.Fe(II).2M$ wherein M is selected from the group consisting of hydrogen, $Ca^{++}/2$ and $Mg^{++}/2$. The iron II complexes are prepared by combining solutions of stoichiometric amounts of ethylenediamenetetraacetic acid disodium salt, disodium calcium salt or disodium magnesium salt, respectively, with a source of iron II such as a water soluble ferrous salt (e.g., ferrous chloride) under nitrogen. The respective iron II complexes precipitate from reaction mixture and can be isolated by filtration, preferably under nitrogen. Attempted preparation of the corresponding iron II diammonium salt from ferrous chloride and ethylenediamenetetraacetic acid diammonium salt yielded the corresponding iron II EDTA diacid (M=H).

In one embodiment of this invention such sodium-free iron II complex, for example, the complex of Formula I wherein M is hydrogen, is isolated in a substantially pure, typically crystalline form, acceptable for food use. The complex is used to prepare a food additive iron-fortificant composition comprising the sodium-free iron II EDTA complex and a nutritional or non-nutritional food acceptable diluent or carrier therefor. In one embodiment the iron fortifying food additive composition further comprises a food acceptable antioxidant such as citric acid, tocopherols DHT, BHA, TBHQ or mixtures thereof, or food acceptable reducing agents such as sulfite or bisulfite salts in amounts effective to minimize iron II oxidation in the formulation. Nutritional diluent or carrier components of the iron fortificant composition can include proteins, fats, starches, sugars and the like. Examples of non-nutritional diluents or carriers include water insoluble bran or water soluble bran extracts such as beta-glucan, and food acceptable chemically modified cellulosics, including gums, glycosaminoglycans and the like. In one embodiment the diluent or carrier component of the food additive composition comprises a combination of nutritional and non-nutritional food acceptable components. The iron II complex typically comprises about 5% to about 80% by weight of the food additive composition, more typically about 10% to about 40% by weight of the composition and it is used in combination with effective amounts of a food acceptable reducing agent or anti-oxidant. A composition comprising an iron II complex of this invention can be used as an added ingredient in standard recipes for processed foods to provide high iron food products useful in treating or preventing dietary iron deficiency. Typically an amount of the sodium-free iron II complex is added to a processed food recipe to increase the iron content to a concentration of about 0.1 to about 40 mg/oz of product, or typically the amount of iron ranges from about 1 to about 25 mg/oz of processed food product. Thus another embodiment of the present invention is an iron fortified processed food product comprising a plurality of nutritional food ingredients selected from the group consisting of protein, fat, and carbohydrates and an iron II EDTA complex of Formula I. In one embodiment the food product recipe is further modified to include an effective amount of a food acceptable reducing agent or antioxidant in an amount effective to prevent or minimize iron II oxidation during processing and storage of the food product. In one embodiment the nutritional food ingredients of the processed food product comprise ingredients derived from cooked cereal grain. In another embodiment nutritional food ingredients of the processed food product comprise nutritional components of dairy origin. The iron complex or a food additive blend of such complex can be used as an added ingredient in the recipe of an unfortified processed food product. The amount of the complex or iron fortificant composition containing said complex added to said recipe is an amount sufficient to raise the iron content in the processed food product to a level of about 1 to about 40 mg./oz. In another embodiment a solution comprising an iron II complex of Formula I, optionally in combination with a food acceptable reducing agent or antioxidant, is sprayed onto the surface of a prepared processed food product, for example a ready-to-eat cereal product to raise the levels of bioavailable iron in said product.

The iron fortified foods available in accordance with this invention can be consumed as part of total dietary regimen to treat or prevent nutritional iron deficiency and associated clinical indications.

EXAMPLES

General

All reagents were obtained from Aldrich Chemical Company. Infrared spectra were recorded with a Nicolet 740 FTIR spectrometer and can be found in the appendix of this report. Magnesium, calcium and iron determinations were performed by Inductively Coupled Plasma Optical Emission Spectroscopy on a Perkin-Elmer ICP Optima 3000 Spectrometer.

Example 1

Preparation of Ethylenediaminetetraacetic Acid, Monoiron(II) Salt, Monohydrate

A 4-neck 12-L round bottom flask was equipped with mechanical stirrer, nitrogen inlet tube, thermometer and condenser with bubbler. A quantity of 372.2 g (1.0 mole) ethylenediaminetetraacetic acid disodium salt was added to the flask followed by the addition of 6 L of water. The flask was purged with nitrogen and stirring under a nitrogen atmosphere was begun. The solid was completely dissolved within a few minutes. To a second flask (2L, three neck, equipped with mechanical stirrer, nitrogen inlet and bubbler) was added 198.8 g (1.0 mole) iron(II) chloride, tetrahydrate under a nitrogen atmosphere, followed by the addition of 1 L of water. Stirring under nitrogen was begun and within a few minutes, all of the iron chloride had dissolved to form a pale green solution. At this point the bubbler was removed from the 2-L flask and replaced with a polystyrene transfer line which was connected on the other end to the 12-L flask through the port formerly used to admit the nitrogen line. With all joints securely wired down, the contents of the 2-L flask were pressure transferred under nitrogen to the 12-L flask, with continual stirring An immediate darkening of the pale green color to a deep blue grey was evident. After stirring for an hour or less, the formation of some solid product was evident. Stirring was continued for 18 hours, after which the reaction flask contents were pressure transferred under nitrogen to a pressure funnel and filtered until no more filtrate was expressed. The contents of the funnel, a blue grey solid, were transferred to a vacuum oven under a nitrogen blanket, and dried in vacuo at 60° C. for 18 hours. The dried product, 220.0 g (60% yield), which analyzed as a monohydrate, was transferred to an amber bottle with handling and storing under nitrogen. Calcd for $C_{10}H_{14}FeN_2O_8$: C, 32.99%; H, 4.43%; N, 7.69%, Fe, 15.3%. Found: C, 33.32%, 33.2%; H, 4.58%, 4.55%; N, 7.79%, 7.81%; Fe, 13.5%.

Example 2

Preparation of Ethylenediaminetetraacetic Acid, Calcium Iron(II) Salt

A 4-neck 5-L round bottom flask was equipped with mechanical stirrer, nitrogen inlet tube, thermometer and condenser with bubbler. A quantity of 328.0 g (0.80 mole) ethylenediaminetetraacetic acid disodium calcium salt was added to the flask followed by the addition of 1.5 L of water. The flask was purged with nitrogen and stirring under a nitrogen atmosphere was begun. The solid was completely dissolved within a few minutes. To a second flask (2L, three neck, equipped with mechanical stirrer, nitrogen inlet and bubbler) was added 159.04 g (0.80 mole) iron(II) chloride, tetrahydrate under a nitrogen atmosphere, followed by the addition of 750 mL of water. Stirring under nitrogen was begun and within a few minutes, all of the iron chloride had dissolved to form a pale green solution. At this point the bubbler was removed from the 2-L flask and replaced with a polystyrene transfer line which was connected on the other end to the 5-L flask through the port formerly used to admit the nitrogen line. With all joints securely wired down, the contents of the 2-L flask were pressure transferred under nitrogen to the 5-L flask, with continual stirring A color change was immediately evident, and the resulting greyish purple reaction mixture was stirred continuously under nitrogen. After stirring for an hour or less, the formation of some white solid product was evident. Stirring was continued for 18 hours, after which the reaction flask contents were pressure transferred under nitrogen to a pressure funnel and filtered until no more filtrate was expressed. During the transfer process the initially white solid began to take on a yellow coloration, which rapidly turned a pale salmon color. The contents of the funnel were washed with 200 mL ice cold water, dried on the funnel until no more filtrate was expressed and finally transferred to a vacuum oven under a nitrogen blanket, and dried in vacuo at 60° C. for 18 hours. The dried product, 217.5 g (63% yield), which analyzed as a hemipentahydrate, was transferred to an amber bottle with handling and storing under nitrogen. Calcd for $C_{10}H_{17}CaFeN_2O_{10.5}$: C, 27.99%; H, 3.99%; N, 6.52%; Ca, 9.34%; Fe, 13.01%. Found: C, 27.16%, 26.95%; H, 4.74%, 4.82%; N, 6.34%, 6.29%; Ca, 9.6%; Fe, 14.0%.

Example 3

Preparation of Ethylenediaminetetraacetic Acid, iron(II) Magnesium Salt

A 4-neck 5-L round bottom flask was equipped with mechanical stirrer, nitrogen inlet tube, thermometer and condenser with bubbler. A quantity of 754.8 g (1.75 mole) ethylenediaminetetraacetic acid disodium magnesium salt (heptahydrate) was added to the flask followed by the addition of 1.75 L of water. The flask was purged with nitrogen and stirring under a nitrogen atmosphere was begun. The solid was completely dissolved within a few minutes. To a second flask (3 L, three neck, equipped with mechanical stirrer, nitrogen inlet and bubbler) was added 348.5 g (1.75 mole) iron(II) chloride, tetrahydrate under a nitrogen atmosphere, followed by the addition of 2.25 L of water. Stirring under nitrogen was begun and within a few minutes, all of the iron chloride had dissolved to form a pale green solution. At this point the bubbler was removed from the 2-L flask and replaced with a polystyrene transfer line which was connected on the other end to the 5-L flask through the port formerly used to admit the nitrogen line. With all joints securely wired down, the contents of the 2-L flask were pressure transferred under nitrogen to the 5-L flask, with continual stirring A color change was immediately evident, and the solution darkened to a red color. Stirring was continued for 18 hours, at which time a somewhat crystalline solid was observed in the flask. The flask contents were pressure transferred under nitrogen to a pressure funnel and filtered until no more filtrate was expressed. During the transfer process the initially pink solid began to take on a reddish coloration, which deepened to a blood red when small quantities of the solid, or aqueous solutions of the product were exposed to the air. The contents of the funnel were washed with 500 mL ice cold water, dried on the funnel until no more filtrate was expressed and finally transferred to a vacuum oven under a nitrogen blanket, and dried in vacuo at 60° C. for 18 hours. The dried product, 215.6 g (25 % yield), which analyzed as a heptahydrate, was transferred to an amber bottle with handling and storing under nitrogen. Calcd for $C_{10}H_{26}FeMgN_2O_{15}$: C, 24.29%; H, 5.30%; N, 5.66%; Fe, 11.29%; Mg, 4.92%; Found: C, 25.87%, 25.36%; H, 4.98%, 5 5.01%; N, 6.04%, 5.92%; Fe, 11.2%; Mg, 5.0%.

Example 4

Attempted Preparation of Ethylenediaminetetraacetic Acid, Diammonium Iron (II) Salt A 4-neck 500 mL round bottom flask was equipped with mechanical stirrer, nitrogen inlet tube, thermometer and condenser with bubbler. A quantity of 34.42 g (0.10 mole) ethylenediaminetetraacetic acid diammonium salt was added to the flask followed by the addition of 150 mL of water. The flask was purged with nitrogen and stirring under a nitrogen atmosphere was begun. The solid was completely dissolved within a few minutes. To a second flask (250 mL, three neck, equipped with mechanical stirrer, nitrogen inlet and bubbler) was added 19.88 g (0.10 mole) iron(II) chloride, tetrahydrate under a nitrogen atmosphere, followed by the addition of 150 mL of water. Stirring under nitrogen was begun and within a few minutes, all of the iron chloride had dissolved to form a pale green solution. At this point the bubbler was removed from the 250 mL flask and replaced with a polystyrene transfer line which was connected on the other end to the 500 mL flask through the port formerly used to admit the nitrogen line. With all joints securely wired down, the contents of the 250 mL flask were pressure transferred under nitrogen to the 500 mL flask, with continual stirring A color change was immediately evident, and the solution darkened to a blue/grey color. Stirring was continued for 18 hours, at which time a somewhat crystalline solid was observed in the flask. The flask contents were pressure transferred under nitrogen to a pressure funnel and filtered until no more filtrate was expressed. The contents of the funnel were washed with 100 mL ice cold water, dried on the funnel until no more filtrate was expressed and finally transferred to a vacuum oven under a nitrogen blanket, and dried in vacuo at 60° C. for 18 hours. The dried product (58.6 g) was found on analysis to be the monoiron salt rather than the desired diammonium iron salt, the ammonium ions having been displaced rather than the protons. The monoiron (II) salt, which analyzed as a hemipentahydrate, was transferred to an amber bottle with handling and storing under nitrogen. It was isolated in 98.7% yield. Calcd for $C_{10}OH_{19}FeN_2O_{10.5}$: C, 30.71%; H, 4.89%; N, 7.16%; Fe, 14.3%. Found: C, 30.25%, 30.24%; H, 5.08%, 5.08%; N, 7.10%, 7.10%; Fe 15.0%.

Example 5

Preparation of Iron Fortified Cereal for Stability and Bioavailability Testing

Cut wheat was mixed with flavor syrup to achieve a moisture content of 27–35 %. The resulting mixture was steamed under 25–30 psi steam pressure in order to achieve a cooked dough. The iron compound of interest along with other vitamins and minerals were mixed into the dough using a ribbon type mixer. The resulting mixture was extruded into dough pellets. The pellets were then flaked and toasted using conventional cereal processing techniques. The finished cereal was then coated with an overspray of vitamins to complete the desired nutritional profile. The finished cereal was then submitted for iron analyses, stability testing and Caco-2 cell culture bioavailability testing.

A. Stability Testing

Test cereal samples were held at 130° F. and assayed for hexanal concentration after 1, 2, 3, 4, and 5 weeks. The iron fortified cereal samples were prepared to contain about 0.3 mg of iron per gram of cereal. Higher hexanal values indicate oxidation and deterioration of the food. Levels greater than about 1.5 ppm hexanal would indicate the food may have deteriorated significantly and might be unacceptable to consumers. The storage stability test data are summarized graphically as follows:

Experiment 5: Iron storage

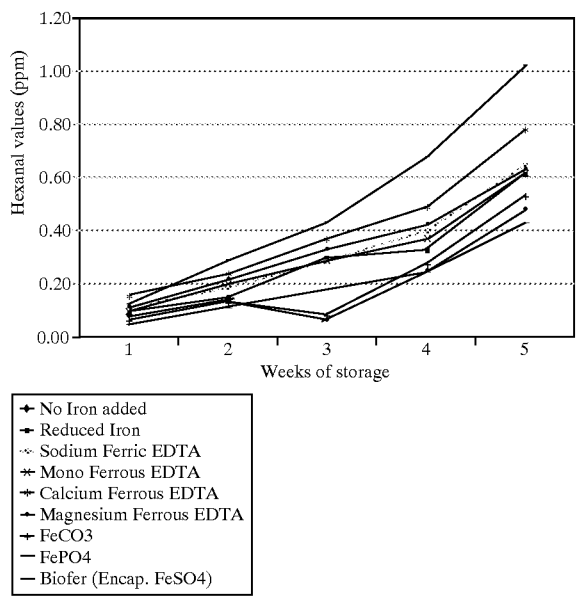

- No Iron added
- Reduced Iron
- Sodium Ferric EDTA
- Mono Ferrous EDTA
- Calcium Ferrous EDTA
- Magnesium Ferrous EDTA
- FeCO3
- FePO4
- Biofer (Encap. FeSO4)

B. Caco-2 Cell Culture Bioavailability

Iron fortified cereal samples were enzymatically digested in vitro in a two chamber system separated by a dialysis membrane. Iron bioavailability was assessed as a function of ferritin levels assayed in Caco-2 cells formed as a monolayers attached to the bottom surface of the lower chamber. The Caco-2 cells were harvested and washed 24 hours after start of digestion. Ferreting levels were determined by a one-stage 2-site immuno radiometric assay.

The data in the following table summarizes levels of ferreting formation as an indicator of iron bioavailability in cereal samples fortified with the indicated iron fortificants. The values are normalized relative to reduced iron.

| Fortificant Compound | Ferreting Formation Percentage Relative to Reduced Iron | Sodium Ferric EDTA Control * |
|---|---|---|
| Café EDTA | 432.57 | 426.27 |
| Magnifiers EDTA | 270.31 | 312.31 |
| MgFeEDTA | 278.44 | 312.31 |
| Reduced Iron | 100 | |

*NaFeEDTA control was prepared and measured along with the test compound. The "controls" differ due to normal variation.

Example 6

A ready-to-eat cereal product fortified with sodium-free ferrous EDTA is prepared using the following ingredients:

TABLE 5

| Ingredient | % Dry Basis | Weight (lbs) |
|---|---|---|
| Corn Flaking Grits | 87.326 | 350.000 |
| Concentrated Flavor | 12.428 | 72.500 |
| Ferrous EDTA (Example 1) | 0.226 | 1.141 |
| Vitamins | 0.020 | 0.069 |

The cereal product is prepared as follows: A cooker is preheated for 30 minutes at 20 psi steam (259° F.). The corn flaking grits, concentrated flavor, vitamins and ferrous EDTA are placed in the cooker and 20 psi steam is applied for about 100 minutes. The cooked cereal is then cooled to room temperature and separated. The cereal is dried to a moisture of 12%–25%, flaked and then dried to a final moisture of 3% or less. Vitamins are sprayed on after drying. The iron content of the finished ready-to-eat cereal product can exceed 10 mg/ounce.

The ferrous EDTA content of the finished product can range from about 0.1 to about 300 mg per one ounce (28.4 g) serving, more preferably about 13 mg to about 140 mg per ounce. The iron fortification ranges from about 0.1 to about 39 mg/oz.

Example 7

Ready-to-eat cereal can also be prepared without adding iron fortificants to the cereal dough. A solution of ferrous EDTA optionally with an antioxidant such as ascorbic acid, can be sprayed onto the product after the cereal pieces are formed.

| Ingredients | % As is | Weight (gms) |
|---|---|---|
| Water | 84.1 | 811.0 |
| Ferrous EDTA | 16.9 | 169.0 |
| Ascorbic Acid | 2.0 | 20.0 |

A solution is prepared by dissolving ferrous diacid EDTA (Example 1) in water in the above proportions.

The ready-to-eat cereal product is produced as described in Example 5, without the ferrous EDTA. After the cereal pieces of approximately 3% moisture level are produced, a ferrous EDTA/water solution is sprayed on the finished product at a rate of 5.00 gm per pound of product. The ferrous EDTA content of the finished product can range from about 0.1 to about 300 mg per one ounce (28.4 g) serving, more preferably about 13 mg to about 140 mg per ounce. The iron fortification ranges from about 0.1 to about 40 mg/oz.

Example 8

A ferrous EDTA complex of this invention can also be combined with additional iron sources, i.e., ferric iron, to fortify ready-to-eat cereal. The following ingredients are prepared:

| Ingredient | Weight (lbs) |
|---|---|
| Corn Flaking Grits | 199.9 |
| Concentrated Flavor | 41.5 |
| Ferrous EDTA | 0.294 |
| Ferric Chloride | 0.026 |
| Vitamins | 0.040 |
| Sucrose | 0.068 |

The ready-to-eat cereal product is prepared as follows: A cooker is preheated for 30 minutes at 20 psi steam. The above ingredients were mixed according to the parameters of Example 1, and further cooked for a total cook time of about 65 minutes. The cooked cereal is then cooled to room temperature and separated. The separated cereal is allowed to temper for two and a half hours at 200° F., separated and flaked through a mill. The cereal flakes are then toasted in jet-zone oven at 450° F. The final iron content of this product is approximately 9.1 mg per ounce.

Example 9

A ferrous EDTA complex of this invention can also be combined with an additional iron source, i.e., ferric iron, in different types of cereal ingredients. Other cereal ingredients selected from the group consisting of wheat, rice, oat, corn, barley, rye, millet, sorghum, amaranth seed and their mixtures can also be used in the preparation of the ready-to-eat cereal or other food products. For example, the following ingredients are prepared:

| Ingredient | % Dry Basis | Weight (lbs) |
| --- | --- | --- |
| Rice | 87.120 | 199.4 |
| Concentrated Flavor | 12.686 | 42.3 |
| Ferrous EDTA | 0.188 | 0.376 |
| Ferric Chloride | 0.006 | 0.013 |

A ready-to-eat cereal product is prepared as follows: A cooker is preheated for 30 minutes at 20 psi steam. The rice was steamed with the iron additives at low gear without water for 20 minutes at 17 psi (254° F.). The flavoring is added, and the mix is cooked for 15 minutes in high gear. The total cook time is about one hour. The cooked cereal is then cooled and separated. The cereal is then dried to a moisture of 20–22%, at 180° F. for about 5 minutes. The cooked cereal is allowed to temper for two hours at 140° to 160° F. The product is gently milled to a density of 0.54 to 0.56 gm/cm³. The milled cereal pieces are then dried to 10% moisture for 10 to 20 minutes at 200° F. and tempered overnight. The cereal pieces are then toasted in a jetzone oven at 450° F. The iron content of the final product can be about 7.2 mg/ounce.

The present ferrous EDTA complexes are novel sodium free fortificants for use in preparation of any of a wide variety of processed foods having cereal products, dairy products, or meat products as their principal ingredients. Ready-to-eat cereal is unusual in that during its preparation the iron fortificants can be added to either to the cereal dough product, which is cooked/heated to form the cereal piece, or their solutions can be sprayed onto the formed cereal piece. The cereal piece is then dried and stored for a potentially long period of time. The cereal product is not generally subjected to any further cooking prior to consumption. In fact, most often the ready-to-eat cereal is simply mixed with milk or other liquid, which can destabilize the cereal piece containing the iron fortificants. On the other hand, many food products that are fortified with iron are required to be heated and consumed soon thereafter. The stability of the iron fortificants in a ready-to-eat product is extremely important to the palatability and physical acceptability of the product to the consumer. Any destabilization can adversely affect the overall characteristics of the product. Stability of the present ferrous EDTA complexes in both processed food product and in iron fortificant food additives wherein the complexes can comprise from about 5% to about 70% by weight of the fortificant composition, can be optimized by adding effective amounts of food acceptable antioxidants or reducing agents.

Other processed food products, such as waffles, snack bars, toaster pastries, pastry products, can be fortified in the same manner with the present ferrous EDTA complexes of formula I, either alone or in combination with an additional iron source.

What is claimed is:
1. An iron II complex of the formula

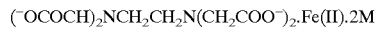

wherein M is selected from the group consisting of $Ca^{++}/2$ and $Mg^{++}/2$.

2. An iron II complex of the formula

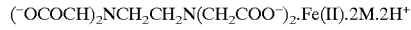

in crystalline form.

3. The complex of claim 1 wherein M is $Ca^{++}/2$.

4. The complex of claim 1, or claim 3 in crystalline form.

5. The complex of claim 1, claim 2 or claim 3 in substantially pure form.

6. A processed food product comprising an iron fortifying amount of the complex of claim 1 blended into a recipe for an unfortified processed food product.

7. A food additive composition comprising an iron II complex of the formula

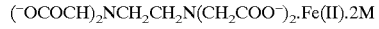

wherein M is selected from the group consisting of $H^+$, $Ca^{++}/2$ and $Mg^{++}/2$, and a nutritional or non-nutritional food acceptable diluent or carrier therefor.

8. The composition of claim 7 further comprising a food acceptable antioxidant or reducing agent.

9. The food additive composition of claim 7 or claim 8 wherein M is $H^+$.

10. The food additive composition of claim 7 or claim 8 wherein M is $Ca^{++}/2$ or $Mg^{++}/2$.

11. The food additive composition of claim 7 wherein the food acceptable carrier or diluent is a nutritional carrier or diluent.

12. The food additive composition of claim 7 wherein the food acceptable carrier or diluent is a non-nutritional carrier or diluent.

13. A processed food product comprising an iron fortifying amount of the composition of claim 7 blended into a recipe for an unfortified processed food product.

14. An iron fortified processed food product comprising a plurality of nutritional food ingredients selected from the group consisting of protein, fat and carbohydrate and an iron II complex of the formula

wherein M is selected from the group consisting of $H^+$, $Ca^{++}/2$ and $Mg^{++}/2$.

15. The processed food product of claim 14 further comprising a food acceptable antioxidant or reducing agent in an amount effective to retard iron II oxidation during food processing or storage.

16. The processed food product of claim 14 or claim 15 wherein the nutritional food ingredients are derived from cooked cereal grain.

17. The processed food product of claim 14 or claim 15 wherein the nutritional food ingredients are of dairy origin.

18. The food product of claim 14 wherein the surface of a processed food product in solid form is contacted with a surface adherent composition comprising an iron II complex of the formula

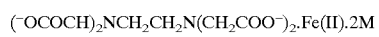

wherein M is selected from the group consisting of $H^+$, $Ca^{++}/2$ and $Mg^{++}/2$, and a nutritional or non-nutritional food acceptable diluent or carrier therefor.

19. The food product of claim 14 wherein the surface of a processed food product in solid form is contacted with a surface adherent composition comprising an iron II complex of the formula

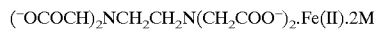

wherein M is selected from the group consisting of $H^+$, $Ca^{++}/2$ and $Mg^{++}/2$, and a nutritional or non-nutritional food acceptable diluent or carrier therefor and a food-acceptable antioxidant or reducing agent.

* * * * *